United States Patent [19]

Langan

[11] Patent Number: 4,913,988
[45] Date of Patent: Apr. 3, 1990

[54] LI$_2$CO$_3$-CA(OH)$_2$ ADDITIVE FOR CATHODES IN NONAQUEOUS CELLS

[75] Inventor: Richard A. Langan, Parma, Ohio

[73] Assignee: Eveready Battery Company, Inc., St. Louis, Mo.

[21] Appl. No.: 61,185

[22] Filed: Jun. 11, 1987

[51] Int. Cl.$^4$ .............................................. H01M 6/14
[52] U.S. Cl. .................................... 429/194; 429/224; 429/218
[58] Field of Search ......................... 429/194, 224, 218

[56] References Cited

U.S. PATENT DOCUMENTS

| | | | |
|---|---|---|---|
| 1,216,451 | 2/1917 | Holmes | 429/224 |
| 1,601,457 | 9/1926 | Smith | 429/224 |
| 4,101,716 | 7/1978 | Horowitz et al. | 429/224 |
| 4,264,689 | 4/1981 | Moses | 429/194 |
| 4,336,315 | 6/1982 | Eda et al. | 429/194 |
| 4,418,130 | 11/1979 | Soltis et al. | 429/206 |
| 4,465,747 | 8/1984 | Evans | 429/194 |
| 4,478,921 | 10/1984 | Langan | 429/194 |

FOREIGN PATENT DOCUMENTS

| | | |
|---|---|---|
| 53-74243 | 7/1978 | Japan . |
| 54-21536 | 2/1979 | Japan . |
| 143664 | 11/1981 | Japan . |

*Primary Examiner*—Anthony Skapars
*Attorney, Agent, or Firm*—Price, Heneveld, Cooper, DeWitt & Litton

[57] ABSTRACT

The specification discloses a nonaqueous electrochemical cell wherein the cathode includes minor amounts of both lithium carbonate and calcium hydroxide.

11 Claims, No Drawings

$Li_2CO_3$-$Ca(OH)_2$ ADDITIVE FOR CATHODES IN NONAQUEOUS CELLS

BACKGROUND OF THE INVENTION

The present invention relates to nonaqueous cells utilizing an active metal anode, a nonaqueous electrolyte solution based on an organic solvent, and a cathode containing an active cathode material such as manganese dioxide, iron sulfide, copper oxide or the equivalent. The development of such high energy battery systems requires the compatibility of an electrolyte possessing desirable electrochemical properties with highly reactive anodic materials, such as lithium, sodium and the like, and the efficient use of active cathode materials such as the manganese dioxide. The use of aqueous electrolytes is precluded in these systems since the anode materials are sufficiently active to react with water chemically. It has therefore been necessary, in order to realize the high energy density obtainable through use of these highly reactive anodes and active cathode materials, to turn to the investigation of nonaqueous electrolyte systems and more particularly to nonaqueous electrolyte systems based on organic solvents.

The term "nonaqueous electrolyte" in the prior art refers to an electrolyte which is composed of a solute, for example, a salt or a complex salt of Group I-A, Group II-A, or Group III-A elements of the Periodic Table, dissolved in an appropriate nonaqueous solvent. Conventional organic solvents include for example propylene carbonate, ethylene carbonate or $\gamma$-(gamma)-butyrolactone. The term "Periodic Table" as used herein refers to the Periodic Table of the elements as set forth on the inside front cover of the Handbook of Chemistry and Physics, 63rd Edition, CRC Press Inc., Boca Raton, Fla., 1982–1983.

Active cathode materials such as manganese dioxide inherently contain an unacceptable amount of water, both of the adsorbed and bound (absorbed) types, which is sufficient to cause anode corrosion along with its associated hydrogen evolution. This type of corrosion, which causes gas evolution, is a serious problem in sealed cells, particularly in miniature type button cells. In order to maintain battery-powered electronic devices as compact as possible, the electronic devices are usually designed with cavities to accommodate the miniature cells as their power source. The cavities are usually made so that a cell can be snugly positioned therein thus making electronic contact with appropriate terminals within the device. A major potential problem in the use of cell-powered devices of this nature is that, if the gas evolution causes the cell to bulge, the cell could become wedged within the cavity. This could result in damage to the device. Also, if electrolyte leaks from the cell it could cause damage to the device. It is therefore important that the physical dimensions of the cell's housing remain constant during discharge and that the cell will not leak any electrolyte into the device being powered.

In order to reduce the water content in the cathode material, several processes have been developed. For example, U.S. Pat. No. 4,133,856 discloses a process for producing an $MnO_2$ electrode (cathode) for nonaqueous cells whereby the $MnO_2$ is initially heated within a range of 350 degrees C. to 430 degrees C. so as to substantially remove both the adsorbed and bound water and then, after being formed into an electrode with a conductive agent and binder, it is further heated in a range of 200 degrees C. to 350 degrees C. prior to its assembly into a cell. British Pat. No. 1,199,426 also discloses the heat treatment of $MnO_2$ in air at 250 degrees C. to 450 degrees C. to substantially remove its water component.

Although cathode materials with reduced water content are better suited for nonaqueous cell systems, it has been noted that cells employing this type of active material have a tendency to show increased internal impedance during storage. This condition is accompanied by poor closed circuit voltage, poor high and low temperature shelf life, poor cell voltage maintenance characteristics, and poor pulse rate and discharge capabilities.

In an attempt to solve these problems, various additives have been proposed for incorporation into the cathodic material. U.S. Pat. No. 4,465,747 to Evans discloses incorporating additives such as lithium silicate, lithium borate, lithium molybdate, lithium phosphate or lithium tungstate in the cathodic material to suppress the build up of internal impedance in the cell during storage and discharge. It also discloses that alkaline earth metal hydroxides or carbonates can be added to the cathodic material for the same purpose. In U.S. Pat. No. 4,478,921, I have previously suggested the use of manganese carbonate or a combination of manganese carbonate and an alkaline earth metal hydroxide or carbonate for the same purpose.

While the use of these additives tends to improve the cell performance, they seem to be rather specifically oriented. For example, the use of calcium hydroxide seems to improve closed circuit voltage retention after storage at elevated temperatures, e.g., 60 degrees C. However, the lower temperature discharge capacity is not as good as one might desire. On the other hand while carbonates appear to improve low temperature performance, closed circuit voltage maintenance and discharge capacity retention after storage at elevated temperatures is not as great when carbonate additives are used.

In an attempt to get an additive effect as to properties, calcium hydroxide and manganese carbonate were used in combination. However, closed circuit voltage retention after storage wa not thereby improved and indeed was nowhere near that achieved using calcium hydroxide alone.

SUMMARY OF THE INVENTION

In the present invention, it has been surprisingly found that by incorporating minor amounts of both calcium hydroxide and lithium carbonate into the cathode of a nonaqueous cell, low temperature cell performance can be substantially improved at no sacrifice to performance after storage at elevated temperatures. Indeed surprisingly, low temperature performance of a cell incorporating a cathode based on this combination was as good or better than that achieved using lithium carbonate or other carbonates alone. These and other objects, advantages and features of the present invention will be more fully understood and appreciated by reference to the following description of the preferred embodiment.

DESCRIPTION OF THE PREFERRED EMBODIMENT

In the preferred embodiment, from about 0.5 to about 2% by weight lithium carbonate, most preferably about 1%, and from about 0.5% to about 6% by weight calcium hydroxide, most preferably 1.3%, are mixed into the cathode material. The resulting cathode mixture is shaped into a cathode body in a conventional manner and is inserted along with an anode, a separator and a nonaqueous electrolyte into a cell housing. The weight percentage used above and throughout this specification are based on the dry weight of the cathode body.

The principal cathode material can be any of the active cathode materials typically used in such nonaqueous cells. Iron sulfide has a theoretical discharge capacity of 893 mAh per gram. Copper oxide has a theoretical discharge capacity of 674 mAh per gram. Manganese dioxide, the preferred cathode material, has a theoretical discharge capacity of 308 mAh per gram.

The minor amounts of lithium carbonate and calcium hydroxide, optionally and preferably along with a binder and a conductive material, may be added to the manganese dioxide utilizing a dry or wet process. As is employed herein the term "dry process" refers to a process wherein the additives are mixed with the manganes dioxide in a dry form. The term "wet process" refers to a process wherein the alkaline earth metal hydroxide is mixed with the manganese dioxide in the presence of water. When a dry process is employed dry calcium hydroxide and lithium carbonate are blended or otherwise directly mixed with dry manganese dioxide. Optionally and preferably, a binder and a conductive material, which materials are also in a dry form, are additionally blended into the dry mix. The dry mix is then formed into a cathode employing molding or other techniques which are well-known to those skilled in the art of battery manufacture. The solid cathode materials are in finely divided form so they can be intimately mixed.

When the calcium hydroxide and lithium carbonate are added to the cathode in a wet process, the calcium hydroxide may be added as either calcium hydroxide suspension or alternatively in the form of a solution or suspension of calcium compound, e.g., calcium oxide, which will form a hydroxide in an aqueous environment. For example, when calcium oxide is added to water its hydration to calcium hydroxide is virtually complete. Although a proportion of calcium hydroxide, when in an aqueous environment, will react with carbon dioxide present in the atmosphere to form calcium carbonate, the presence of such trace calcium carbonate will not interfere with the beneficial effect of the calcium hydroxide. A binder and conductive material are preferably added to the wet mix before molding. In a wet production process, such binder and/or conductive material may be added in a dry or wet form. When a wet mix is employed in the production of a pellet-type cathode, a drying step will typically be required before the cathode mix can be shaped. This drying step typically comprises heating the mixture at a temperature of between about 120 degrees C. and about 150 degrees C. until the cathode mix is sufficiently dry.

The cathode mixture may then be shaped into a cathode body by means well-known to those skilled in the art of battery manufacture. After shaping the cathode body, it is typically dried at a temperature of between about 120 degrees C. and about 180 degrees C. under vacuum. This final drying step is done regardless of whether a wet or dry mix process is used.

As mentioned above, the amount of adsorbed and bound water present in manganese dioxide should be reduced before such manganese dioxide can be employed in nonaqueous cells. Thus, the manganese dioxide employed in the process is preferably treated so as to remove absorbed water prior to being mixed with calcium hydroxide and lithium carbonate.

The water inherently contained in both electrolytic and chemical types of manganese dioxide can be substantially removed by various treatments. For example, the manganese dioxide can be heated in air or an inert atmosphere at a temperature of 350 degrees C. for about eight hours or at a lower temperature for a longer period of time. Care should be taken to avoid heating the manganese dioxide above its decomposition temperature which is about 400 degrees C. in air. In oxygen atmospheres, higher temperatures may be employed. Preferably, the manganese dioxide should be heat treated to remove its water content in the crystal lattice to below about 1 weight percent.

It is noteworthy that if a wet process is employed in the mixing step of the process of this invention, water will not be reabsorbed into the crystal lattice of the manganese dioxide. Thus, the post mixing drying steps described above are sufficient to remove water adsorbed by the manganese dioxide in the mixing and pelletizing steps.

Illustrative of the binders which may be employed in the cathode of this invention are polytetrafluoroethylene, ethylene/propylene copolymers and the like. Representative of the conductive materials which may be employed are graphite, carbon and the like. Acetylene black is a preferred form of carbon. The binders may comprise between about 1 and about 10 weight percent, preferably between about 3 and about 5 weight percent, of the dry cathode mix while the conductive material may comprise between about 1 and about 12 weight percent, preferably between about 3 and about 10 weight percent, of the dry cathode mix.

Useful highly active metal anode materials include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide. The preferred anode materials are lithium, sodium, potassium, calcium and alloys thereof.

Useful organic solvents for the nonaqueous electrolyte, employed alone or mixed with one or more other solvents, include the following classes of compounds:

| | Liquid Range |
|---|---|
| Alkylene nitriles: | −51.1° C. to 120° C. |
| e.g., crotonitrile | |
| Trialkyl borates: | −29.3 to 67° C. |
| e.g., trimethyl borate, (CH$_3$O)$_3$B | |
| Tetraalkyl silicates: | |
| e.g., tetramethyl silicate (CH$_3$O)$_4$Si (boiling point, 121° C.) | |
| Nitroalkanes: | −17 to 100.8° C. |
| e.g., nitromethane, CH$_3$NO$_2$ | |
| Alkylnitriles: | −45 to 81.6° C. |
| e.g., acetonitrile, CH$_3$CN | |
| Dialkylamides: | −60.48 to 149° C. |
| e.g., dimethylformamide, HCON(CH$_3$)$_2$ | |
| Lactams: | −16 to 202° C. |
| e.g., N-methylpyrrolidone, | |

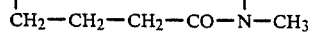

| | Liquid Range |
|---|---|
| Tetraalkylureas:<br>e.g., tetramethylurea,<br>$(CH_3)_2N—CO—N(CH_3)_2$ | −1.2 to 166° C. |
| Monocarboxylic acid esters:<br>e.g., ethyl acetate | −83.6 to 77.06° C. |
| Orthoesters:<br>e.g., trimethylorthoformate,<br>$HC(OCH_3)_3$<br>(boiling point, 103° C.) | |
| Lactones:<br>e.g., γ-butyrolactone,<br>$\overline{CH_2—CH_2—CH_2—O—CO}$ | −42 to 206° C. |
| Dialkyl carbonates:<br>e.g., dimethyl carbonate,<br>$OC(OCH_3)_2$ | 2 to 90° C. |
| Alkylene carbonates:<br>e.g., propylene carbonate,<br>$\overline{CH(CH_3)CH_2—O—CO—O}$ | −48 to 242° C. |
| Monoethers:<br>e.g., diethyl ether | −116 to 34.5° C. |
| Polyethers:<br>e.g., 1,1- and 1,2-dimeth-<br>oxyethane | −113.2 to 64.5° C. and<br>−58 to 83° C.,<br>respectively |
| Cyclic ethers:<br>e.g., tetrahydrofuran<br>1,3-dioxolane | −65 to 67° C.<br>−95 to 78° C. |
| Nitroaromatics:<br>e.g., nitrobenzene | 5.7 to 210° C. |
| Aromatic carboxylic acid<br>halides: e.g., benzoyl<br>chloride | 0 to 197° C. |
| benzoyl bromide | −24 to 218° C. |
| Aromatic sulfonic acid halides:<br>e.g., benzene sulfonyl chloride | 14.5 to 251° C. |
| Aromatic phosphonic acid<br>dihalides: e.g., benzene<br>phosphonyl dichloride<br>(boiling point, 258° C.) | |
| Aromatic thiophosphonic acid<br>dihalides: e.g., benzene<br>thiophosphonyl dichloride<br>(boiling point, 124° C. at 5 mm) | |
| Cyclic sulfones:<br>e.g., sulfolane,<br>$\overline{CH_2—CH_2—CH_2—CH_2—SO_2}$<br>(melting point, −22° C.)<br>3-methylsulfolane<br>(melting point, −1° C.) | |
| Alkyl sulfonic acid halides:<br>e.g., methanesulfonyl chloride<br>(boiling point, 161° C.) | |
| Alkyl carboxylic acid halides:<br>e.g., acetyl chloride | −112 to 50.9° C. |
| Acetyl bromide | −96 to 76° C. |
| Propionyl chloride | −94 to 80° C. |
| Saturated heterocyclics:<br>e.g., tetrahydrothiophene<br>3-methyl-2-oxazolidone<br>(melting point, 15.9° C.) | −96 to 121° C. |
| Dialkyl sulfamic acid halides:<br>e.g., dimethyl sulfamyl<br>chloride<br>(boiling point, 80° C. at 16 mm) | |
| Alkyl halosulfonates:<br>e.g., ethyl chlorosulfonate<br>(boiling point, 151° C.) | |
| Unsaturated heterocyclic<br>carboxylic acid halides:<br>e.g., 2-furoyl chloride | −2 to 173° C. |
| Five-membered unsaturated<br>heterocyclics:<br>e.g., 3,5-dimethylisoxazole<br>(boiling point, 140° C.) | −85.65 to 31.36° C. |
| 1-methylpyrrole<br>(boiling point, 114° C.)<br>2,4-dimethylthiazole<br>(boiling point, 144° C.)<br>furan<br>Esters and/or halides of dibasic<br>carboxylic acids: e.g., ethyl<br>oxalyl chloride<br>(boiling point, 135° C.)<br>Mixed alkyl sulfonic acid<br>halides and carboxylic acid<br>halides: e.g., chlorosulfonyl<br>acetyl chloride<br>(boiling point, 98° C. at 10 mm) | |
| Dialkyl sulfoxides:<br>e.g., dimethyl sulfoxide | 18.4 to 189° C. |
| Dialkyl sulfates:<br>e.g., dimethylsulfate | −31.75 to 188.5° C. |
| Dialkyl sulfites:<br>e.g., dimethylsulfite<br>(boiling point, 126° C.) | |
| Alkylene sulfites:<br>e.g., ethylene glycol sulfite | −11 to 173° C. |
| Halogenated alkanes:<br>e.g., methylene chloride<br>1,3-dichloropropane | −95 to 40° C.<br>−99.5 to 120.4° C. |

The preferred solvents are 3-methyl-2-oxazolidone, sulfolane, tetrahydrofuran, methyl-substituted tetrahydrofuran, 1,3-dioxolane, propylene carbonate, ethylene carbonate, γ-butyrolactone, ethylene glycol sulfite, dimethylsulfite, dimethyl sulfoxide and 1,1- and 1,2-dimethyoxyethane or mixtures thereof.

In some applications in accordance with this invention when the viscosity of a solvent would be too high, the addition of a low viscosity cosolvent may be desirable. The low viscosity cosolvents which can be used include tetrahydrofuran (THF), methyl-substituted tetrahydrofuran(Met-THF), dioxolane (DIOX), dimethoxyethane (DME), dimethyl isoxazole (DMI), diethyl carbonate (DEC), ethylene glycol sulfite (EGS), dioxane, dimethyl sulfite (DMS) or the like. Dimethoxyethane (DME), and dioxolane (DIOX) are preferred cosolvents because of their compatibility with metal salts and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, for example, $LiCF_3SO_3$, $LiBF_4$, $LiAsF_6$, $LiPF_6$ and $LiClO_4$ which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 - July/December, 1938, pp. 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, phosphorus pentafluoride, arsenic pentafluoride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

The cell housing itself is of a conventional construction, comprising preferably a container of a material such as stainless steel or nickel-plated (or clad) stainless steel (external side only), a cover of a material such as stainless steel, nickel-plated (or clad) steel (or stainless steel) seated on a polypropylene gasket located within the container and an asphalt sealant over the gasket and between the peripheral exterior and interior edge walls of the cover and container respectively. A conventional separator of a material such as Craneglas 200-12$^{198}$ glass fiber or porous polypropylene is employed between the electrodes. The interior surface of the cell container may be conductively coated, if desired.

In the best mode currently contemplated for practicing the present invention, a 0.020 gram lithium foil anode and a 0.360 gram cathode are placed in the above described housing utilizing a Craneglas 200-12$^{198}$ glass fiber separator along with 104 milligrams of an electrolyte comprising a one molar solution of $LiCF_3SO_3$ in a 1:1 by volume mixture of propylene carbonate and dimethoxyethane. The cathode comprises 91.7% manganese dioxide, 3% polytetrafluoroethylene binder, 3% acetylene black, 1.3% calcium hydroxide and 1% lithium carbonate (when additional amounts of additives are employed, the amount of manganese dioxide is decreased accordingly).

EXPERIMENTAL DATA

In the experimental examples reported below, nonaqueous coin cells (cell outside diameter, 0.787 inch maximum; cell height, 0.063 inch maximum) were made in accordance with the best mode described above, except that in some examples additives other than the lithium carbonate and calcium hydroxide combination of the present invention were employed in order to illustrate the efficacy of and the surprising results achieved by the present invention. Also, the quantity of lithium carbonate was increased relative to the quantity of calcium hydroxide in some of the examples.

In each example, at least nine test cells were made out of the same lot of cathode material. In Table I, three different sets of tests were conducted on three different sets of three cells for each example. The values recorded in the various columns in Table I comprise an average of the readings obtained for the three cells.

The first set of tests involves determining the performance of the cells when they are fresh. The closed circuit voltage (CCV) for each cell was observed two seconds after initiation of a 400-ohm discharge load. The three cells were then discharged across a 30,000 (30K)-ohm continuous load, with a superimposed 400-ohm pulse load (once per day, three days per week, for two seconds). The mAh outputs to a 2.0-volt cutoff (background and pulse loads) were determined for each of the three cells in each set and the average values are recorded in Table I.

The second set of test data involves precisely the same measurements as were conducted on the fresh cells, except that the cells were first aged for 40 days at 60 degrees C. The average values for closed circuit voltage first obtained and the mAh outputs to 2.0 volts under the continuous and pulse loads are recorded in Table I.

In the third set of tests recorded in Table I, the low temperature performance of the cells was determined. First, the cells in each set were stored at -10 degrees C. for four hours and then discharged across a 400-ohm pulse load for two seconds. The closed circuit voltage wa determined and is recorded in the column labeled "0 days."Then, the cells were continuously discharged across a 30K-ohm load at 21 degrees C. for 11 days, after which they were again chilled at -10 degrees C. for four hours and discharged across a 400-ohm pulse load for two seconds. The average closed circuit voltage for the three cells in each set is recorded under the column "11 days."Thereafter, the cells were again discharged across a 30K-ohm load at 21 degrees C. for another 11 days, placed at -10 degrees C. for four hours and pulse-discharged across a 400-ohm load for two seconds. The closed circuit voltage was then determined again and is recorded in the column labeled "22 days."

TABLE I

| Example No. | Variable | First Test Set 21° C. Discharge Fresh | | | Seconds Test Set 21° C. Discharge With Aging 40 days/60° C. | | | Third Test Set Low Temp. Performance 30KΩ Cont. at 21° C./400Ω, 2 sec. Pulse Voltage after 4 hrs. at −10° C. | | |
|---|---|---|---|---|---|---|---|---|---|---|
| | | 400Ω/2 sec. CCV | mAh to 2.0 V 30KΩ Cont. | 400Ω Pulse | 400Ω/2 sec. CCV | mAh to 2.0 V 30KΩ Cont. | 400Ω Pulse | 4 Days | 11 Days | 22 Days |
| 1 | 1.3% (Ca(OH)$_2$ | 2.85 | 70 | 65 | 2.78 | 70 | 59 | 2.64 | 2.31 | 2.08 |
| 2 | 1% Li$_2$CO$_3$ | 3.13 | 69 | 65 | 2.31 | 69 | 56 | 2.84 | 2.41 | 2.13 |
| 3 | 1.3% Ca(OH)$_2$ | 2.85 | 75 | 56 | 2.81 | 77 | 47 | 2.61 | 2.27 | 1.19 |
| 4 | 1% | | | | | | | | | |

TABLE I-continued

| Example No. | Variable | First Test Set 21° C. Discharge Fresh | | | Seconds Test Set 21° C. Discharge With Aging 40 days/60° C. | | | Third Test Set Low Temp. Performance 30KΩ Cont. at 21° C./400Ω, 2 sec. Pulse Voltage after 4 hrs. at −10° C. | | |
|---|---|---|---|---|---|---|---|---|---|---|
| | | 400Ω/2 sec. CCV | mAh to 2.0 V 30KΩ Cont. | 400Ω Pulse | 400Ω/2 sec. CCV | mAh to 2.0 V 30KΩ Cont. | 400Ω Pulse | 4 Days | 11 Days | 22 Days |
| 5 | $Li_2CO_3$ 1.3% $Ca(OH)_2$/ 1% $MnCO_3$ | 3.03 | 75 | 63 | 2.66 | 66 | 44 | 2.71 | 2.32 | 1.91 |
| 6 | 1.3% $Ca(OH)_2$/ 1% $Li_2CO_3$ | 2.86 | 74 | 62 | 2.51 | 76 | 50 | 2.55 | 2.25 | 1.95 |
| 7 | 1.3% $Ca(OH)_2$/ 2% $Li_2CO_3$ | 2.88 | 76 | 62 | 2.75 | 77 | 55 | 2.57 | 2.27 | 2.08 |
| | | 2.82 | 76 | 63 | 2.70 | 73 | 41 | 2.53 | 2.25 | 1.96 |

Referring to Examples 1 and 3, it can be seen that a cell containing 1.3% calcium hydroxide in the manganese dioxide cathode performs very well after 40 days of storage at 60 degrees C. The mAh output under continuous and pulse loads is similarly very comparable to the same values for a fresh cell. Turning to low temperature performance, closed circuit voltage retention appears to be acceptable, though it is noted that in Example 3, the closed circuit voltage after 22 days of discharge at 30K-ohms and a two-second pulse at 400-ohms after four hours at −10 degrees C. was only 1.19 volts (which voltage is well below the accepted 2.0 volt cutoff) compared to 2.61-volts for the fresh cell after storage for four hours at −10 degrees C.

Referring to Examples 2 and 4, it can be seen that a cell incorporating 1% lithium carbonate in the manganese dioxide cathode simply lacks satisfactory closed circuit voltage retention with aging for 40 days at 60 degrees C. Further, the initial closed circuit voltage with aging is low compared to that for cells incorporating 1.3% $Ca(OH)_2$ alone.

Referring to Example 5, the combination of 1.3% calcium hydroxide and 1% manganese carbonate in the manganese dioxide cathode similarly performs poorly in terms of closed circuit voltage retention after 40 days aging at 60 degrees C. Again, initial closed circuit voltage with aging is low compared to the cell containing only the $Ca(OH)_2$ additive.

Examples 6 and 7 involve the use of cells made in accordance with the present invention. These cells showed generally superior closed circuit voltage retention after discharge for 22 days following low temperature storage. Yet, the Example 6 and 7 cells showed closed circuit voltage retention after 40 days aging at 60 degrees C. which was almost as great as the closed circuit voltage retention exhibited by the Example 1 and 3 cells. Further, the initial CCV fresh values for the Example 6 and 7 cells is acceptably comparable to the corresponding values for the Example 1 and 3 cells.

Examples 8 and 9 reported in Table II below involve a comparison of a manganese dioxide cathode cell containing 1.3% calcium hydroxide additive with a cell made in accordance with the most preferred embodiment of the present invention (1) when the cells are fresh, (2) after aging at 60 degrees C., and (3) under continuous and pulsed loads at -40 degrees C. The determinations of closed circuit voltage and mAh for the fresh cell and for the cells after aging were conducted in the same manner as described above. However the third set of tests in Table II involved the determination of the mAh output of the cells to a 2.0-volt cutoff under a 30K-ohm continuous load at -40 degrees C., and the mAh output of the cells to a cutoff voltage of 1.5 volts after a superimposed two-second pulse discharge at 400 ohms. As above, this pulse was conducted once a day, three days a week.

TABLE II

| Example No. | Variable | First Test Set 21° C. Discharge Fresh | | | Second Test Set 21° C. Discharge With Aging 40 days/60° C. | | | Third Test Set −40° C. | |
|---|---|---|---|---|---|---|---|---|---|
| | | 400Ω/2 sec. CCV | mAh to 2.0 V 30KΩ Cont. | 400Ω Pulse | 400Ω/2 sec. CCV | mAh to 2.0 V 30KΩ Cont. | 400Ω Pulse | mAh to 2.0 V 30KΩ Cont. | mAh to 1.5 V 400Ω Pulse (2 seconds) |
| 8 | 1.3% $Ca(OH)_2$ | 2.90 | 81 | 70 | 2.77 | 79 | 64 | 64 | 38 |
| 9 | 1.3% $Ca(OH)_2$/ 1% $Li_2CO_3$ | 3.01 | 76 | 68 | 2.82 | 81 | 60 | 73 | 55 |

As can be seen by the test results, the performance of the cells made in accordance with the present invention was far superior in terms of mAh output at −40 degrees C. to the performance of a cell using only 1.3% calcium hydroxide additive.

Thus, nonaqueous cells in which the cathode contains minor amounts of both calcium hydroxide and lithium carbonate afford superior performance under low temperature conditions with no substantial difference in cell performance under normal conditions and after aging at elevated temperatures compared to prior art nonaqueous cells.

Of course it is understood that the foregoing is merely a preferred embodiment of the invention and that various changes and alterations can be made without departing from the spirit and broader aspects thereof.

The embodiments of the invention in which an exclusive property or privilege is claimed are defined as 1. A nonaqueous cell comprising an active metal anode, a nonaqueous electrolyte solution comprising a solute dissolved in at least one organic solvent, and a solid cathode comprising an active cathode material, wherein the improvement comprises:
   said cathode containing a minor amount of both lithium carbonate and calcium hydroxide.

2. The nonaqueous cell of claim 1 wherein said calcium hydroxide is present in said cathode in an amount of from about 0.5% to about 6%, and said lithium carbonate is present in said cathode in an amount of from about 0.5% to 3. The nonaqueous cell of claim 2 in which said active cathode material is manganese dioxide.

4. The nonaqueous cell of claim 3 in which said active metal is lithium.

5. The nonaqueous cell of claim 4 in which said solute is $LiCF_3SO_3$ present in said solvent in about a 1 molar concentration.

6. The nonaqueous cell of claim 5 in which said solvent is about a 1:1 by volume mixture of propylene carbonate and dimethyoxyethane.

7. The nonaqueous cell of claim 1 wherein said lithium carbonate is present in said cathode in an amount of about 1% by weight and said calcium hydroxide is present in said cathode in an amount of about 1.3% by weight.

8. The nonaqueous cell of claim 7 in which said active cathode material is manganese dioxide.

9. The nonaqueous cell of claim 8 in which said active metal is lithium.

10. The nonaqueous cell of claim 9 in which said solute is $LiCF_3SO_3$ present in said solvent in about a 1 molar concentration.

11. The nonaqueous cell of claim 10 in which said solvent is about a 1:1 by volume mixture of propylene carbonate and dimethyoxyethane.

* * * * *